United States Patent
Huang

(10) Patent No.: US 8,266,767 B1
(45) Date of Patent: Sep. 18, 2012

(54) FAUCET HANDLE

(75) Inventor: Li-Chen Huang, Changhua Hsien (TW)

(73) Assignee: Alexander Yeh Industry Co., Ltd., Changhua Hsien (TW)

( * ) Notice: Subject to any disclaimer, the term of this patent is extended or adjusted under 35 U.S.C. 154(b) by 0 days.

(21) Appl. No.: 13/099,361

(22) Filed: May 3, 2011

(51) Int. Cl.
*E05B 1/00* (2006.01)
*B25G 1/10* (2006.01)

(52) U.S. Cl. ............... 16/441; 16/436; 16/DIG. 30

(58) Field of Classification Search ......... 16/441, 16/414, 417, 436, DIG. 30; 137/315.12, 137/315.14, 315.15, 315.35, 801, 359, 382.5; 74/532, 533, 548, 553, 543, 551.9, 557; 4/675, 4/676, 678; 251/293, 291, 285, 286; 403/361, 403/369, 359.6, 383, 365
See application file for complete search history.

(56) References Cited

U.S. PATENT DOCUMENTS

| | | | | |
|---|---|---|---|---|
| 1,989,083 A * | 1/1935 | Dahnken et al. | ............ | 403/288 |
| 2,191,304 A * | 2/1940 | Ashendorf | .............. | 16/432 |
| 2,898,776 A * | 8/1959 | Spencer | ............ | 74/553 |
| 3,376,888 A * | 4/1968 | Anthony | ............ | 137/359 |
| 4,065,216 A * | 12/1977 | Nelson | ............ | 403/4 |
| 4,616,673 A * | 10/1986 | Bondar | ............ | 137/315.15 |
| 4,794,945 A * | 1/1989 | Reback | ............ | 137/315.12 |
| 4,842,009 A * | 6/1989 | Reback | ............ | 137/315.15 |
| 4,876,766 A * | 10/1989 | Cohen | ............ | 16/426 |
| 4,961,443 A * | 10/1990 | Buccicone et al. | ...... | 137/315.15 |
| 5,025,826 A * | 6/1991 | Schoepe et al. | ......... | 137/315.15 |
| 5,216,781 A * | 6/1993 | Brondfield | ............ | 16/426 |
| 7,231,935 B2 * | 6/2007 | Huang | ............ | 137/315.15 |

* cited by examiner

Primary Examiner — Chuck Y. Mah

(57) ABSTRACT

A faucet handle includes a handle having a containment space, the containment space having an assembly aperture on a top surface, the assembly aperture accepting a limiting member, with two limiting ribs disposed adjacent to two opposite sides of the assembly aperture. An adjusting member has a through aperture and two engaging columns adjacent to a side of the through aperture. Each engaging column is inserted between the two limiting ribs of the handle. The adjusting member also has two engaging slots adjacent to another side of the through aperture and an assembly device having an assembly base. The assembly base has an assembly space and two positioning columns adjacent to the assembly space, and each positioning column engages with an engaging slot of the adjusting member.

3 Claims, 7 Drawing Sheets

FAUCET HANDLE

BACKGROUND OF THE INVENTION

1. Field of the Invention

The present invention relates to a faucet handle, and more particularly to a faucet handle having a containment space and an adjusting member, which can be connected to different types of faucet shafts.

2. Description of the Related Art

Currently, people enjoy faucets with various styles. Moreover, people like to do home improvements by themselves. However, each faucet has a control shaft having various cross-sectional shapes and sizes, and so the consumer needs to select a matching faucet handle, which can be very inconvenient.

Therefore, it is desirable to provide a universal faucet handle to mitigate and/or obviate the aforementioned problems.

SUMMARY OF THE INVENTION

An objective of the present invention is to provide a faucet handle having a containment space and an adjusting member, which can be connected to different types of faucet shafts.

In order to achieve the above-mentioned objectives, an improved the faucet handle comprises a handle having a containment space, the containment space having an assembly aperture on a top surface, the assembly aperture providing a limiting member, and limiting ribs disposed adjacent to opposite sides of the assembly aperture; an adjusting member having a through aperture and two engaging columns adjacent to a side of the through aperture, each engaging column inserted between limiting ribs of the handle, the adjusting member further having engaging slots adjacent to another side of the through aperture; and an assembly device having an assembly base, the assembly base having an assembly space and positioning columns adjacent to the assembly space, each positioning column engaging with the engaging slot of the adjusting member.

With the above-mention embodiment, the following benefits can be obtained: 1. Since the containment space of the handle has the adjusting member providing different heights, the handle can be used with various control shafts with different lengths. 2. Since the clamping face of the clamping member has a stepped surface providing a plurality of clamping spaces with different cross-sectional dimensions, the handle can be used with various control shafts having different dimensions and shapes.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
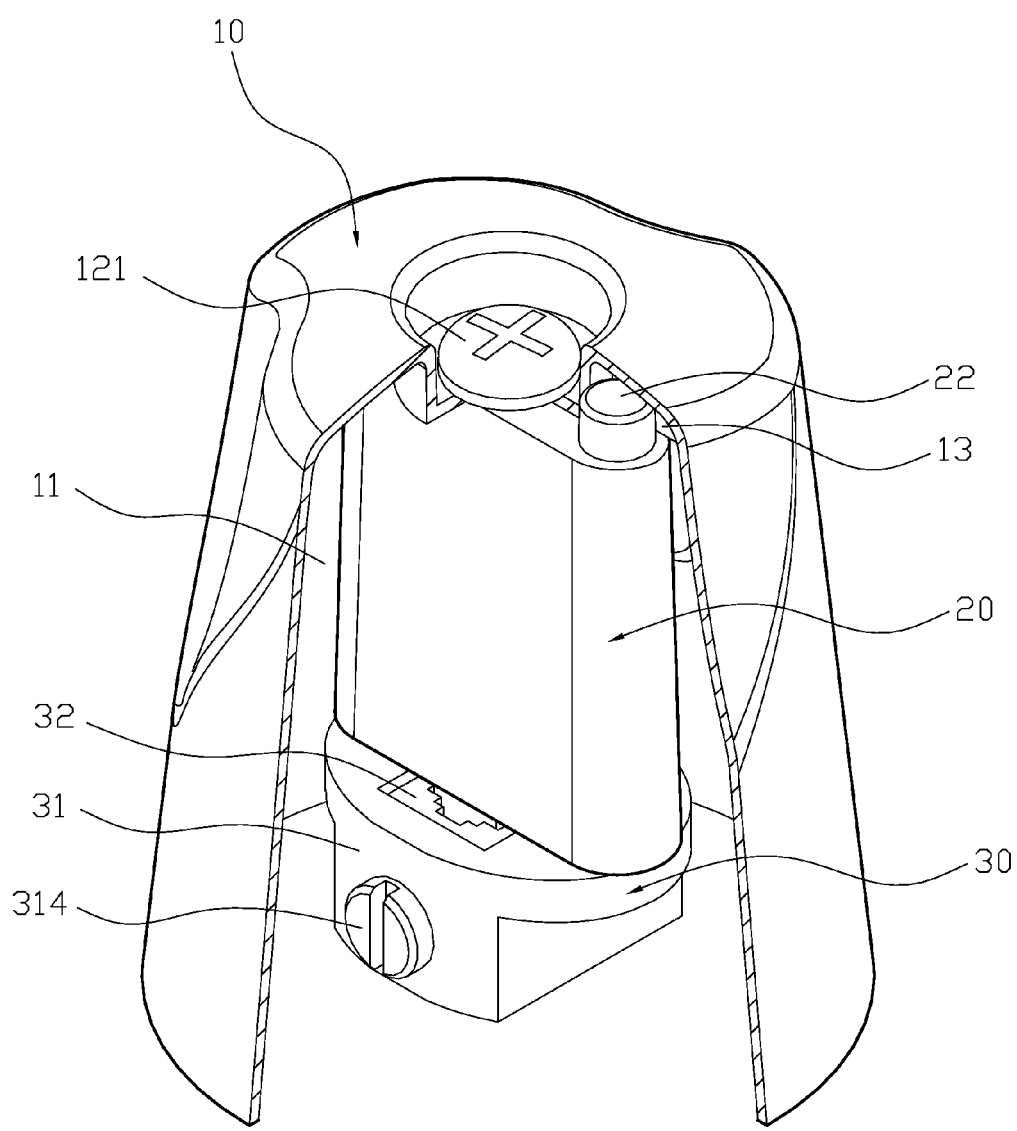
FIG. 1 is a perspective schematic view of an embodiment of the present invention.
Figure 2:
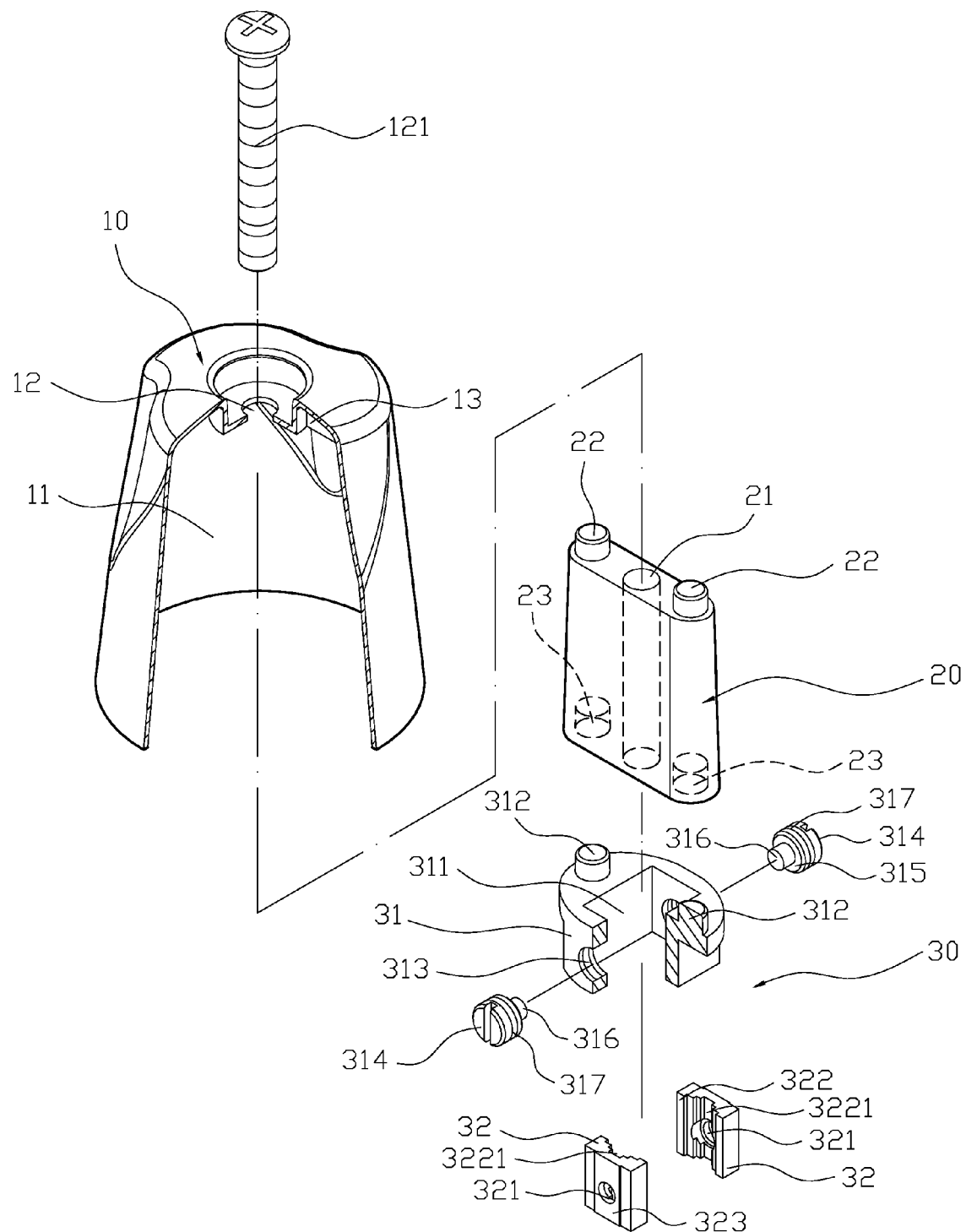
FIG. 2 is a perspective exploded view of an embodiment of the present invention.
Figure 3:
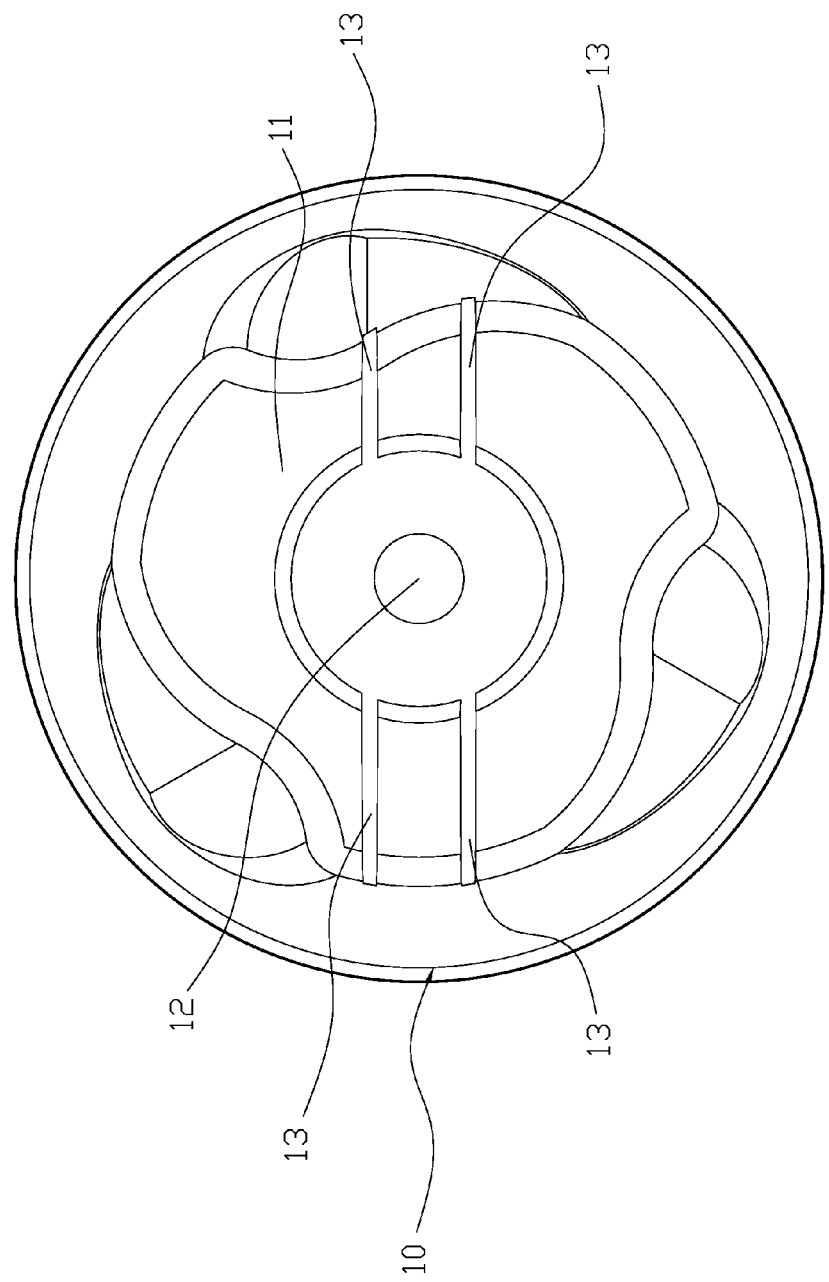
FIG. 3 is another schematic view of a handle according to an embodiment of the present invention.

First, please refer to FIG. 1 and FIG. 2. A faucet handle has a handle 10, an adjusting member 20 and an assembly device 30. The handle 10 has a containment space 11, and the containment space has an assembly aperture 12 on a top surface. The assembly aperture 12 accepts a limiting member 121, and two limiting ribs 13 are respectively disposed adjacent to two opposite sides of the assembly aperture 12, as shown in FIG. 3. The adjusting member 20 has a through aperture 21 and two engaging columns 22 adjacent to sides of the through aperture 21, and each engaging column 22 is inserted between the two limiting ribs 13 of the handle 10. The adjusting member 20 further has two engaging slots 23 adjacent to another side of the through aperture 21. The assembly device 30 has an assembly base 31 and two clamping member 32. The assembly base 31 has an assembly space 311 and two positioning columns 312 adjacent to the assembly space 311, and each positioning column 312 engages with an engaging slot 23 of the adjusting member 20. Furthermore, an aperture 313 is disposed on the periphery of the assembly space 311; the aperture 313 accepts a connecting member 314. The connecting member 314 has a pushing face 315 on a side, and the pushing face 315 has an assembling column 316. The connecting member 314 further includes a threaded portion 317 on another side. Each clamping member 32 has an assembling aperture 321; the assembling aperture 321 is used for accepting the assembling column 316 of a connecting member 314 and has a clamping face 322 and a contacting face 323. The contacting face 323 makes contact with the pushing face 315 of the corresponding connecting member 314.

Figure 4:
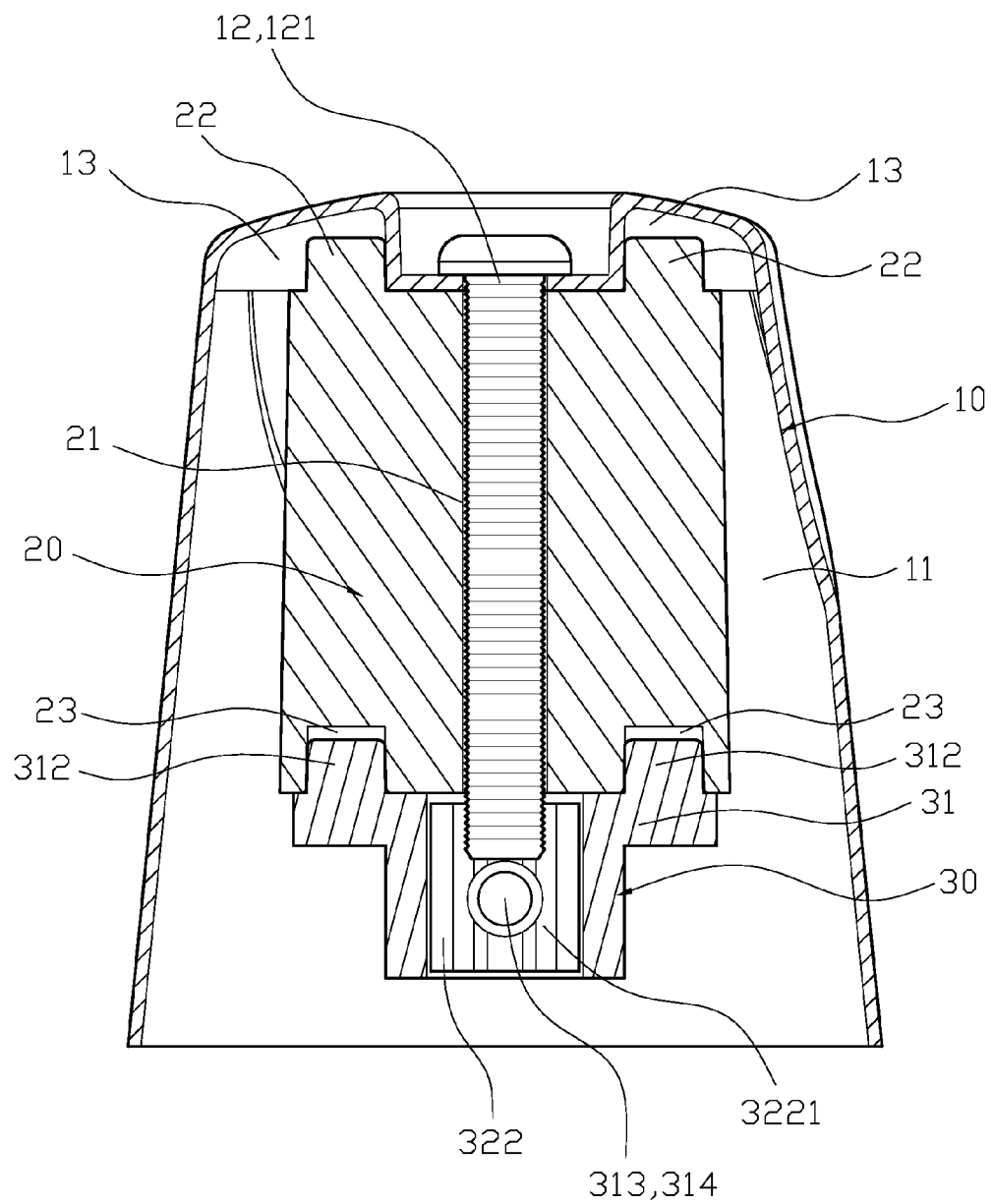
FIG. 4 is a cross-sectional view of an embodiment of the present invention.
Figure 5:
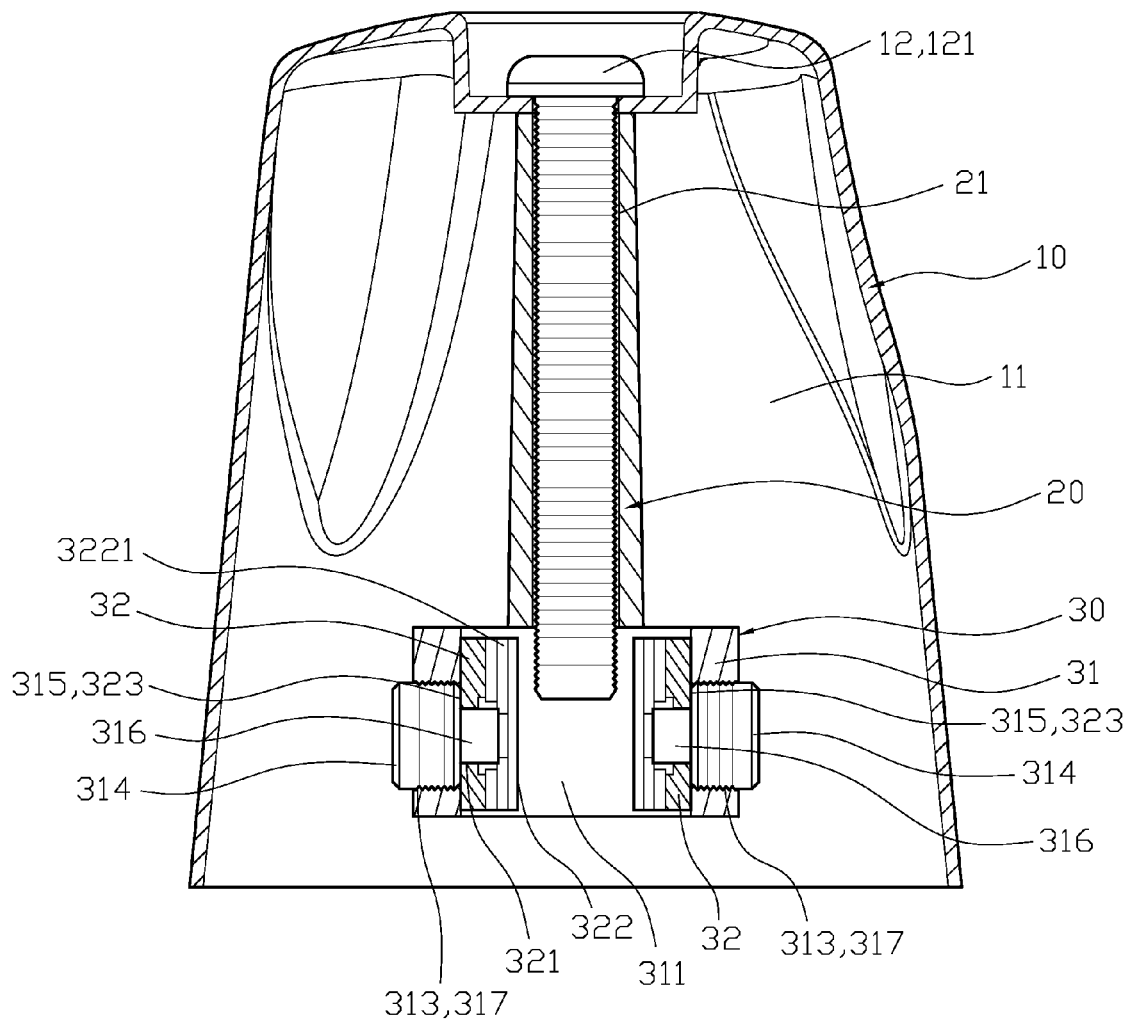
FIG. 5 is another cross-sectional view of an embodiment of the present invention.

For actual assembly, please refer to FIG. 4 and FIG. 5 with further reference to FIG. 2. First, the two clamping members 32 are placed in the assembly space 311 of the assembly base 31, such that the assembling aperture 321 of each clamping member 32 faces a respective aperture 313 of the assembly base 31, and the connecting members 314 are secured with the apertures 313 of the assembly base 31 via the threads 317. Furthermore, each assembling column 316 of the connecting members 314 are placed through respective assembling apertures 321 of the clamping members 32, such that each pushing face 315 of the connecting members 314 push against the respective contacting face 323 of the clamping members 32 to complete the assembly device 30. Next, the engaging slots 23 of the adjusting member 20 are jacketed onto the positioning columns 312 of the assembly base 30, so the containment space 11 of the handle 10 accepts the adjusting member 20 and the assembly device 30, and the engaging columns 22 of the adjusting member 20 are each inserted between two limiting ribs 13 of the handle 10.

Figure 6:
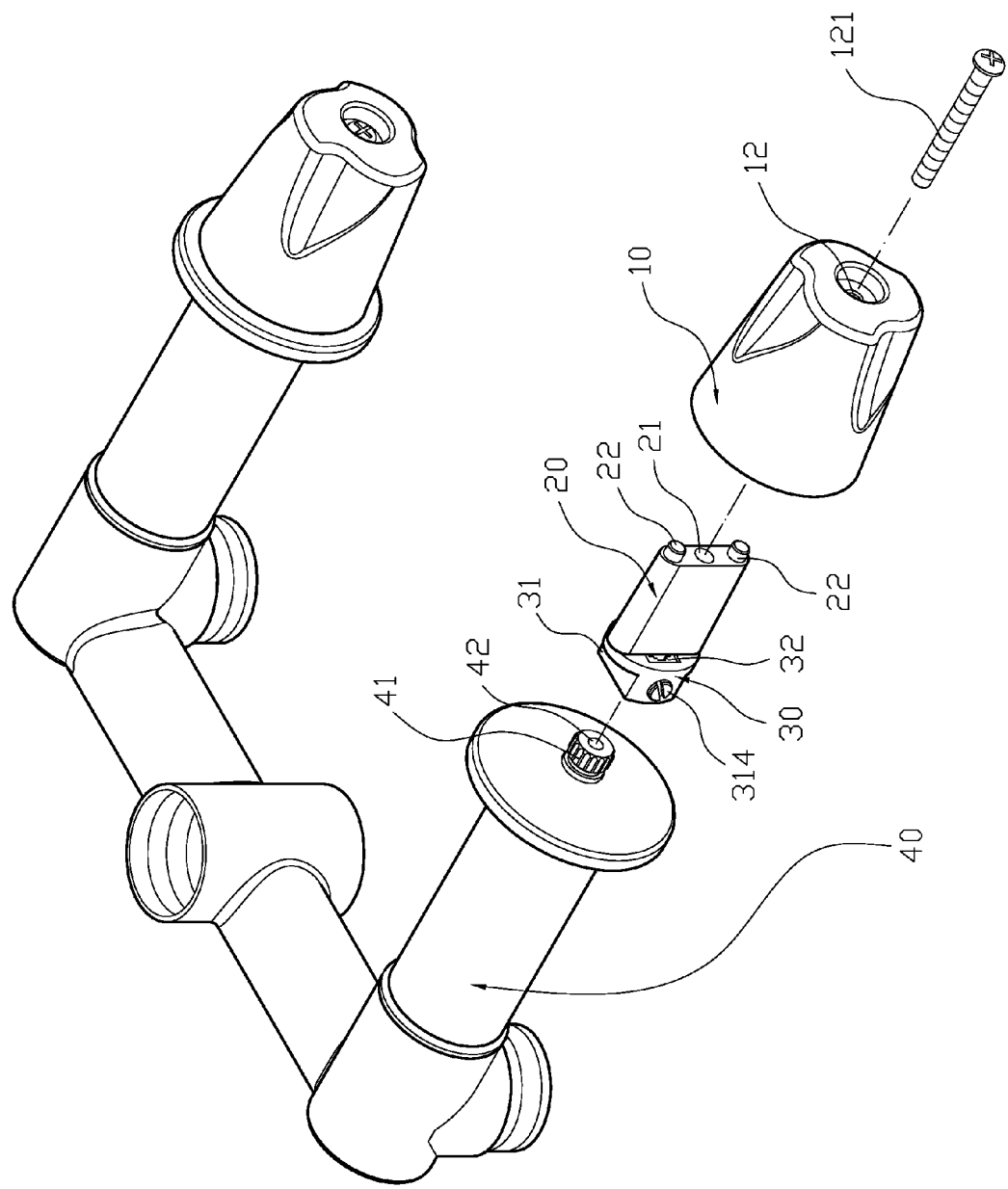
FIG. 6 is a perspective exploded view of an embodiment assembled with a faucet according to the present invention.
Figure 7:
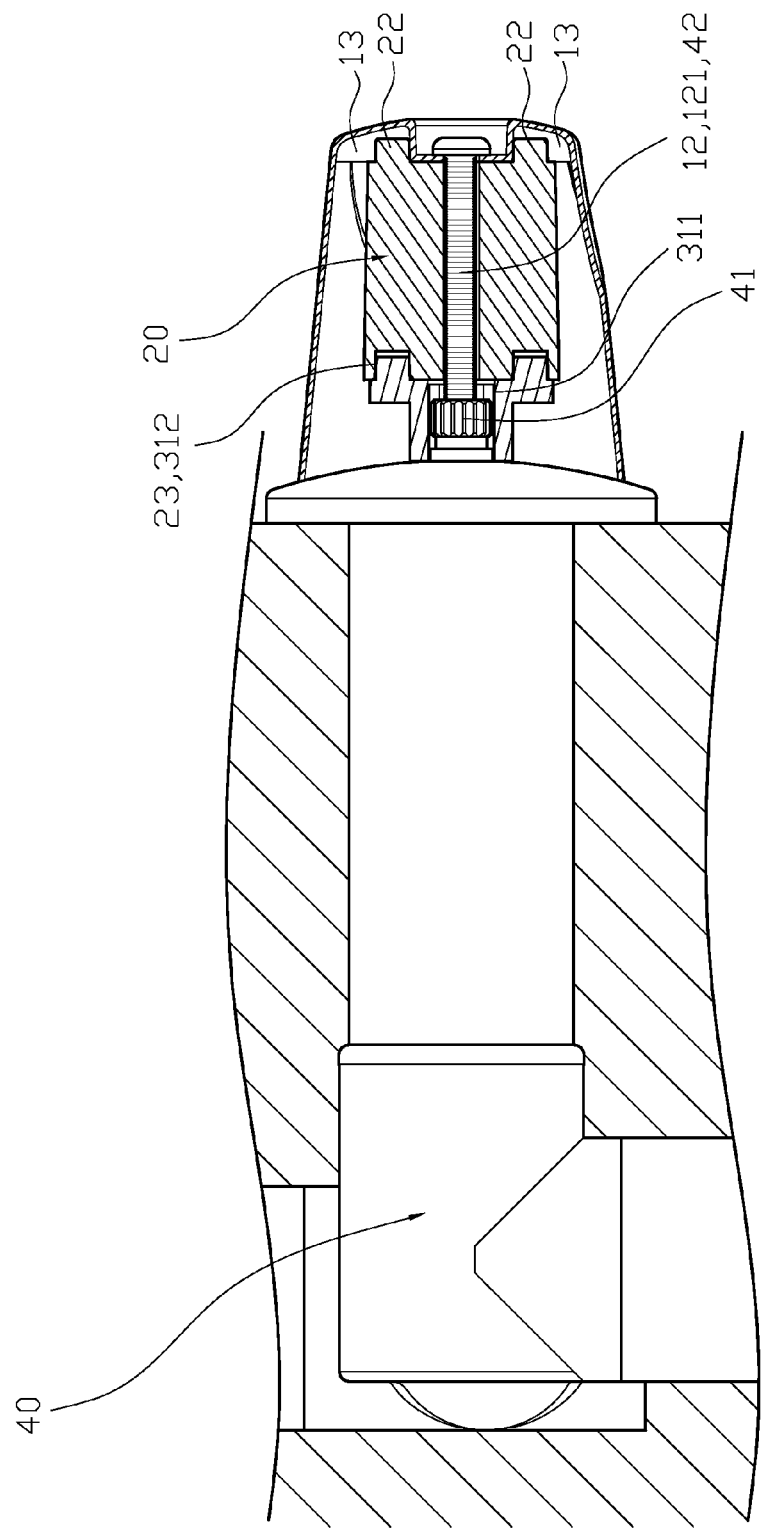
FIG. 7 is a cross-sectional view of an embodiment assembled with a faucet according to the present invention.

For actual use, please refer to FIG. 6 with reference to FIG. 2. The handle is suitable for a faucet 40. The faucet 40 has a control shaft 41 with a short columnar shape, and the control shaft 41 further has a connecting aperture 42. When the user wants to assemble the handle, he or she first causes the assembly space 311 of the assembly base 31 to jacket onto the control shaft 41 of the faucet 40, and then screws the connecting members 314 towards the assembly space 311 such that the connecting members 314 utilize their pushing faces 315 to push against the contacting faces 323 of the clamping member 32. Therefore, the clamping member 32 is able to induce movement in the connecting member 314, which causes the clamping face 322 to tighten onto the control shaft 41. Moreover, the adjusting member 20 utilizes the engaging slots 23 to engage with the positioning columns 312 of the assembly base 31; the handle 10 covers with the containment space 11, and the engaging columns 22 of the adjusting member 20 are inserted between their respective limiting ribs 13 of the handle 10. Finally, the limiting member 121 is placed through the assembly aperture 12 and the through aperture 21 of the adjusting member 20 and secured with the connecting aperture 42 of the control shaft 41 to complete the handle, as shown in FIG. 7. Since the adjusting member 20 is placed between the handle 10 and the assembly base 31, and the handle 10 is provided with a greater height, the handle is able to match the length the control shaft 41. In addition, the adjusting member 20 can be disassembled from the assembly base 31 to permit the positioning columns 312 of the assembly base 31 to be directly inserted between the respective two limiting ribs 13 of the handle 10 which can decrease the distance between the handle 10 and the assembly base 31 to adjust the height of the handle 10 so that the handle is suitable for various control shafts having different lengths.

With the above-mention embodiment, the following benefits can be obtained: 1. Since the containment space 11 of the handle 10 has the adjusting member 20 that provides different heights, the handle can be used with various control shafts having different lengths. 2. Since the clamping faces 322 of the clamping members 32 have stepped surfaces providing a plurality of clamping spaces 3221 with different cross-sectional dimensions, the handle can be employed with various control shafts 41 having different dimensions and shapes.

Although the present invention has been explained in relation to its preferred embodiment, it is to be understood that many other possible modifications and variations can be made without departing from the spirit and scope of the invention as hereinafter claimed.

What is claimed is:

1. A faucet handle comprising:
   a handle having a containment space, the containment space having an assembly aperture on a top surface, the assembly aperture accepting a limiting member, and limiting ribs disposed adjacent to opposite sides of the assembly aperture;
   an adjusting member having a through aperture and engaging columns adjacent to one end of the through aperture, each engaging column inserted between respective limiting ribs of the handle, the adjusting member further having engaging slots adjacent to an opposite end of the through aperture; and
   an assembly device having an assembly base, the assembly base having an assembly space and positioning columns adjacent to the assembly space, each positioning column engaging with a respective engaging slot of the adjusting member.

2. The faucet handle as claimed in claim 1, wherein an at least one aperture is disposed on the periphery of the assembly space, each aperture accepting a connecting member, the connecting member having a pushing face on a side; the pushing face having an assembling column, the connecting member further including a threaded portion on another side and the assembly device further has a plurality of clamping members, each clamping member having an assembling aperture; wherein the assembling aperture is used for accepting the assembling column of the connecting member and has a clamping face and a contacting face, and the contacting face makes contact with the pushing face of a respective connecting member.

3. The faucet handle as claimed in claim 2, wherein the clamping face of each clamping member has a stepped surface providing a plurality of clamping spaces with different cross-sectional dimensions.

* * * * *